Jan. 21, 1969          H. S. JACOBS          3,423,616
           INDUCED CURRENT TORQUE TRANSMITTERS
Filed Oct. 20, 1965                          Sheet 1 of 2

INVENTOR
HENRY S. JACOBS

BY *Arthur H. Seidel*

ATTORNEY

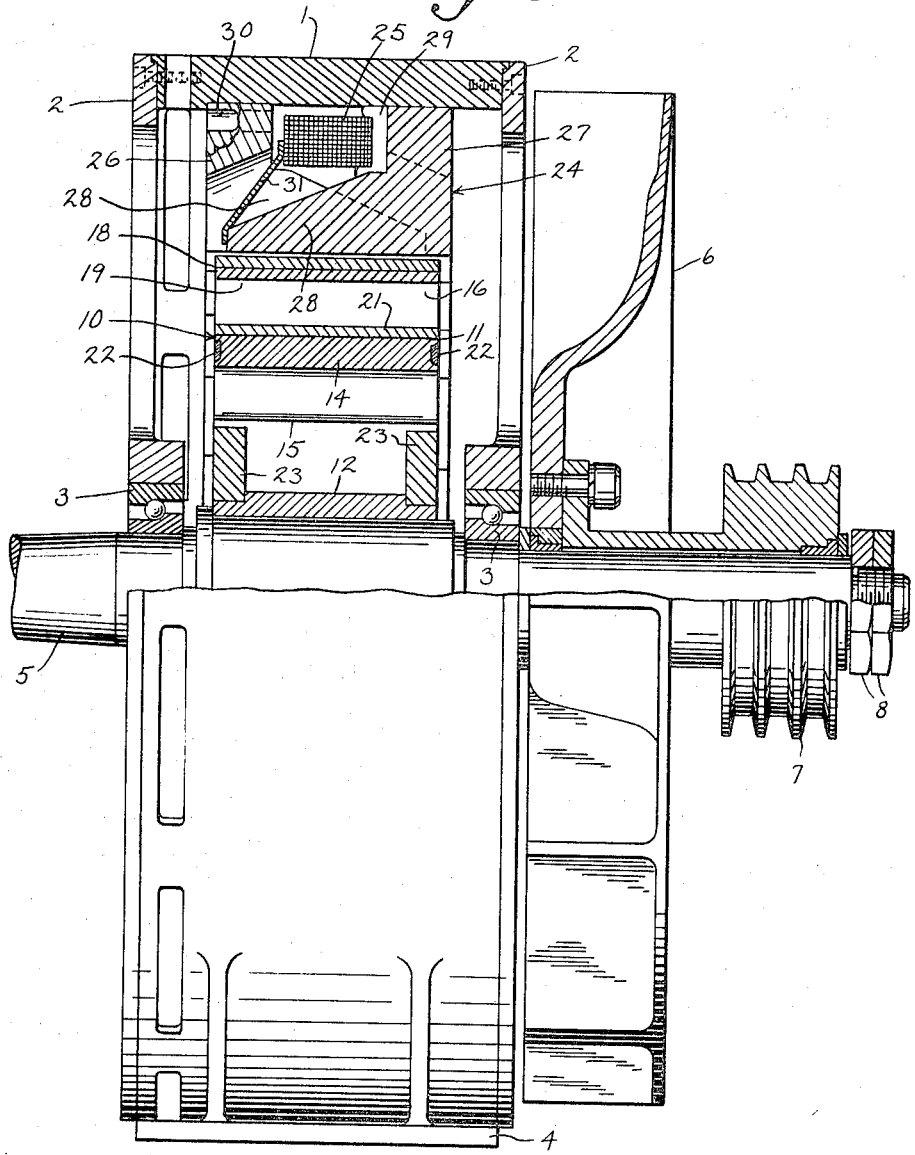
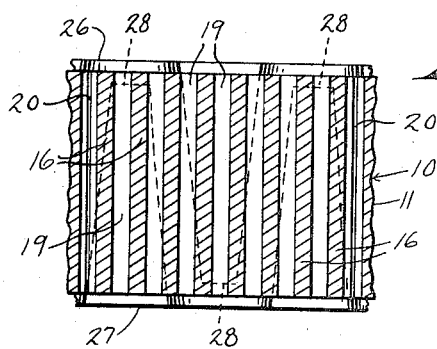

United States Patent Office

3,423,616
Patented Jan. 21, 1969

3,423,616
INDUCED CURRENT TORQUE TRANSMITTERS
Henry S. Jacobs, Shorewood, Wis.
(4113 N. Downer, Milwaukee, Wis. 53211)
Filed Oct. 20, 1965, Ser. No. 498,287
U.S. Cl. 310—105     13 Claims
Int. Cl. H02k 49/02; H02p 15/00

ABSTRACT OF THE DISCLOSURE

An induced current torque transmitter having relatively rotatable field and induced current members, the induced current member having a first magnetic rim closely spaced from the field member and a second magnetic rim disposed radially inward from the first magnetic rim that is joined to the first rim through a plurality of radially extending magnetic spokes, so that magnetic flux established by the field member traverses said first magnetic rim and also said spokes and said second magnetic rim to develop induced current throughout the induced current member for the improved production of torque.

---

Figure 1:
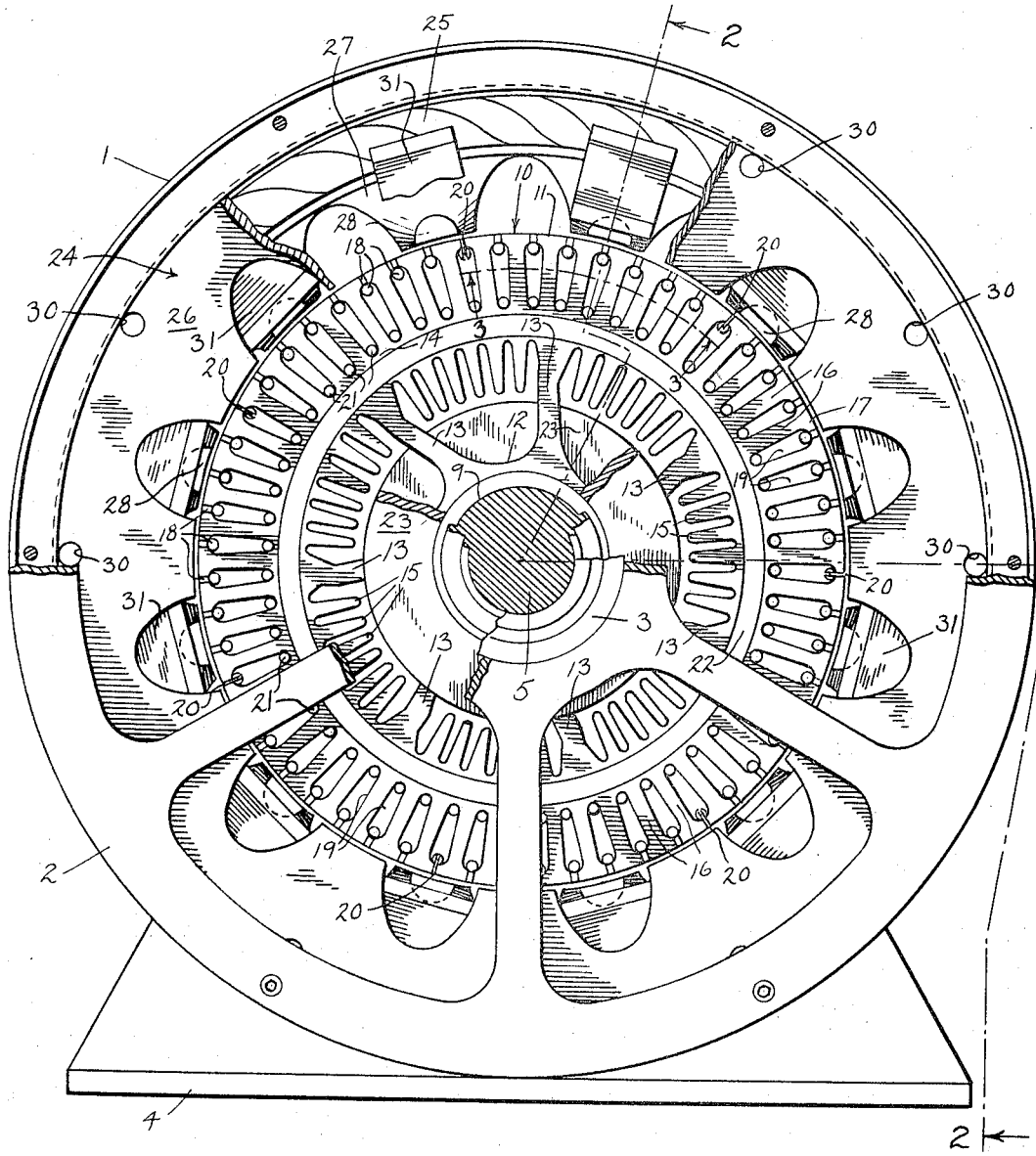

Torque transmitters of the class of this invention are used as clutches and brakes for delivering very substantial torques, as for example in drives for crane and excavator shovel motions. My patents, Nos. 2,773,202, 2,773,204, 2,773,998, 2,776,386 2,846,601 and 3,113,229, and Patent No. 2,762,940 disclose various forms which prior torque transmitters have taken. In general, it is a purpose of torque transmitters of the class under consideration to efficiently develop high torques and to achieve such high torque values at both low and high shaft speeds. To accomplish these objectives large induced currents are generated within an induced current member, and the resulting evolved heat presents a dissipation problem, for without adequate heat dissipation the torque transmitter is limited in its capacity to do work. The foregoing patents are largely directed to this particular problem.

In a transmitter of the present invention the induced current member is not a single, shallow rim of magnetic material, but instead comprises a pair of concentric rims integrally connected by radial spokes that conduct magnetic flux between rims. One rim constitutes a relatively thin air gap rim closely spaced to a field member, and the other rim is radially spaced substantially apart from the field member. Induced currents are generated in both rims and the connecting spokes, with the bulk of the heat evolved being in close vicinity to a surface from which it may be dissipated to cooling air. In a preferred form additional cooling fins may be formed on the second rim, and a highly conductive end ring is associated with the rim to enhance the torque generation arising from the induced currents in the rim. The spokes between rims are spaced to present generous openings through which the cooling air can pass, thereby quickly dissipating evolved heat, so that large induced current torques can be generated to improve efficiency of the apparatus. Prefered forms of the invention also provide for cooling the winding of the field member, thus further improving performance of the apparatus.

Among the objects of this invention are an increase in torque for a given size of an induced current transmitter; more effective cooling for such an apparatus; improved air flow characteristics about the surface of the field coil; a diversion during low speed operation of the majority of the field flux from an air gap rim to a concentric rim radially displaced a substantial distance from the air gap rim; the provision of an end ring for such concentric rim; and improved torque-speed characteristics for a torque transmitter having a very sharp increase in torque at increments of low speeds with a rapid build up to maximum values.

Other objects and advantages of the invention may appear from the following description. In the description reference is made to the accompanying drawings which form a part hereof and in which there is shown by way of illustration a specific form in which the invention may be embodied. This embodiment will be described herein in sufficient detail to enable one skilled in the art to practice the invention, but it is to be understood that other designs and apparatus may be utilized in practicing the invention, and that structural changes in the elements described herein may be made by those skilled in the art without departing from the true scope of the present invention.

In the drawings:

FIG. 1 is a side view in elevation with parts broken away and in section of an induced current torque transmitter embodying the invention, FIG. 2 is an end view in elevation of the induced current torque transmitter of FIG. 1 with parts broken away and in section, and FIG. 3 is a fragmentary view taken in the plane 3—3 indicated in FIG. 2.

The induced current torque transmitter of the darwings has a circular cylindrical outer frame 1 with spoked end plates 2 that mount a pair of shaft bearings 3. The spokes of the end plates 2 are widely spaced to present large side openings through which cooling air may readily pass, as is shown in the lower part of FIG. 1. The outer frame 1 also has a supporting stand 4 upon which the apparatus is mounted.

Carried by the shaft bearings 3 is an output torque shaft 5 that overhangs outwardly from each of the end plates 2. As viewed in FIG. 2, the left hand end of the shaft 5 is adapted to be connected to a device to be either driven or braked by the apparatus, and the right hand end of the shaft 5 mounts a centrifugal fan 6 driven by a pulley 7. The fan 6 is mounted on bearings to rotate relative to the shaft 5, so that it may be independently driven at high speed and draw cooling air through the apparatus during slow shaft speed operation. If desired, locking nuts 8 at the outer end of the shaft 5 may be pinned to the pulley 7 to secure the fan 6 to the shaft 5 and cause it to rotate with the shaft, so that an auxiliary power supply for the fan 6 need not be required in installations where the apparatus will normally be run at fairly high shaft speeds.

Mounted on a central hub 9 of the shaft 5, which hub is located between the spoked end plates 2, is a rotor 10 of which the principal part is an induced current member 11 formed from a unitary piece of magnetic material. The member 11 has an intricate configuration, as particularly observed from FIG. 1, and in manufacture it may be cut, by burning, from a solid magnetic steel block. In its finished form, the induced current member 11 has a central hub 12 that tightly encircles and is keyed to the output shaft 5. From the hub 12 a number of supporting spokes 13, which are disposed oblique to radial lines, extend outwardly for integral connection with an inner magnetic rim 14. The rim 14 is concentric with the shaft 5 and extends uninterruptedly in a complete circle to form one of the flux conducting portions of the member 11. A plurality of integral, circumferentially spaced cooling fins 15 extend radially inward from the rim 14 for the purpose of conducting heat evolved within the rim 14 away from the heat generating areas into a path of cooling air, as will be described.

A plurality of magnetic spokes 16, which are also an integral part of the induced current member 11, extend radially outward from the inner rim 14 and merge at their outer ends with an outer magnetic rim 17. The rim 17 is also an integral part of the induced current member 11, and the outer face of the rim 17 defines one side of an air gap, and consequently may be termed an air gap rim for convenience of designation. The circumferentially spaced spokes 16 together with the inner and outer rims 14 and 17 form a plurality of radial elongate air channels 19 in the member 11 to provide for the passage of cooling air through and between flux conducting portions of the apparatus.

The outer, or air gap rim 17 is also characterized in that it is interrupted between each spoke 16 by a low resistance, highly conductive current conductor bar 18. Each bar 18 of the embodiment shown in the drawings is a composite of a copper rod on the inside of the rim 17 and a deposit of welded copper filling a slot within the rim 17. Hence, when the outer face of the rim 17 is machined to finished dimension each current conductor bar 18 will be flush with such finished face, and will extend radially through the rim 17 from the outer end of a channel 19 to the outer rim surface. This construction, besides providing low resistance current paths, increases the reluctance of the air gap rim 17 to force substantial amounts of flux to the inner rim 14.

The outer, or air gap rim 17 also is distinguished by a series of circumferentially spaced expansion slots 20, as shown in FIG. 1. These slots 20 are spaced approximately one for every eight spokes 16, and upon heating circumferential expansion can occur for the rim 17 with minimal radial growth of the rotor 10.

A second set of low resistance conductor bars 21 are secured in the radially inner ends of the air channels 19, and are also comprised of copper or other suitable metal. This second set of inductor bars 21 are optional, and are employed to obtain particular speed-torque characteristics in which the torque may more sharply increase at slow speeds, but which may fall off at higher speeds. Hence, the location of conductor bars for practice of the invention is dependent upon design characteristics that are to be achieved, and therefore may be inserted or omitted as desired.

Copper end rings 22 are inlaid on the opposite sides of the inner magnetic rim 14, and the rotor 10 is completed by the provision of a pair of air baffle plates 23 mounted on the axial ends of the hub 12. These plates 23 block air flow at the center of the induced current member 11, so that air is directed between the cooling fins 15 and through the air channels 19 formed by the magnetic spokes 16, so that cooling air is directed principally to the particular regions where evolved heat is brought to the surface areas of the member 11 for efficient dissipation.

Surrounding the rotor 10 is a field member 24 that includes an annular field coil 25 and magnetic pole rings 26 and 27 on each side of the coil 25. Each of the magnetic pole rings 26 and 27 is comprised of an annular portion adjacent the coil 25 from which a plurality of pole piece fingers 28 extend radially inward and then turn axially across the inner face of the field coil 25. Such a field member construction is generally known in the art, as indicated in the aforementioned patents, Nos. 2,773,204 and 2,762,940. The pole piece fingers 28 of one magnetic pole ring 26 are interdigited with the pole piece fingers 28 of the other field member 24 so as to have poles of alternating polarity upon energization of the field coil 25.

In the present invention the field coil 25 is supported by a series of synthetic spacers 29, one of which is shown in FIG. 2, located at both of the coil sides. In this manner, the outer circumferential face of the coil 25 is spaced from the outer frame 1 to allow cooling air to circulate behind the outside face of the coil 25. Further each of the side faces of the coil 25 is spaced from the magnetic pole rings 26 and 27, so that cooling air may freely circulate around the entire coil 25. The magnetic pole ring 26, which is disposed on the side of the apparatus opposite the fan 6, may have a plurality of air channels 30 through which cooling air drawn by the fan 6 may enter for more effective cooling of the coil 25. In addition, the pole piece fingers 28 of the pole ring 27 have air baffle plates 31 tacked, or otherwise firmly secured, to their left hand ends, as viewed in FIG. 2, to deflect air entering through the left hand spoked end plate 2 radially outward to flow behind the coil 25. In this fashion enhanced distribution of cooling air is achieved.

The operation of the apparatus may first be considered at slow shaft speeds. For this condition the magnetic flux estabilshed by direct current in the coil 25 will pass from the pole piece fingers 28 through the small air gap between the rotor 10 and field member 24 into the induced current member 11. This flux will divide between the magnetic circuits presented by (i) the outer, or air gap rim 17 and by (ii) the inner magnetic rim 14 and the associated radial magnetic spokes 16. The outer magnetic rim 17 is of substantially lesser cross section area than the flux path provided by the inner magnetic rim 14 and the associated magnetic spokes 16, so that a larger proportion of the flux will be shunted radially inward through the magnetic spokes 16 and through the magnetic rim 14. The flux established by the field coil 25 will be swept by the rotating rotor 10, so as to have an alternating characteristic with respect to the rotor. Currents are thus induced in the magnetic portions of the induced current member 11, as well as in the copper conductors 18 and 21. The magnetic paths afforded by the inner rim 14 and spokes 16 are of greater cross section than magnetic paths afforded in ordinary thin rimmed induced current torque transmitters, and there is a consequent proportionately large generation of induced current in the magnetic paths of the inner rim 14 and spokes 16. This enhances torque output of the apparatus, and accompanying heat is evolved from the flow of induced currents. This heat is conducted through the radially inner cooling fins 15 to large surface areas exposed to cooling air, and heat evolved within the spokes 16 is readily conducted to the surfaces of the spokes which form a part of the air channels 19 and function as cooling surfaces. The size and location of copper rotor bars also contribute to the generation of torque, and their size and design may be altered so as to achieve particular desired torque characteristics. For example, where high torque at high speed is desired and torque at low speed is of lesser importance the second set of inductor bars 21 may be eliminated and the copper bars 18 may be replaced by steel. In addition, the inlaid end rings 22 further contribute to the effective flow of induced currents to develop improved torque output.

For increased shaft speed the frequency of cutting flux in the rotor 10 correspondingly increases. Current generated within the spokes 16 will tend to flow near the outer side surfaces of the spokes 16, and therefore be close to the cooling air of the channels 19. Heat evolution is thereby enhanced, so that the magnetic material of the structure can be worked to greater capacity than in prior devices without undesirably large temperature increases and resulting thermal expansion. While higher shaft speeds will be accompanied by increased reluctance due to counter electromotive forces, the torque output will nevertheless maintain high values because of the effective use of the magnetic circuits provided by the inner rim 14 and spokes 16.

For large shaft speeds the magnetic flux will become concentrated in the outer, or air gap rim 17. At such speeds the increased rate of cutting flux will produce large required torques.

The apparatus of the invention achieves high torque values for a wide range of operation because of the configuration of the induced current member 11. The member 11 spreads the generation of induced currents and evolved heat throughout a large spacial volume, as contrasted with usual thin rimmed induced current torque transmitters. The heat generated is in close proximity to surface areas from which the heat may escape and be carried away in a cooling air stream. Thermal expansion is thereby controlled, and rapid heat dissipation allows for more effective induced current generation, wherefore for a given amount of magnetic material the apparatus of the invention is more effective. An accompanying advantage is that the width of the rotor 10 may be reduced, and correspondingly the length of the air channels 19 is reduced with the result that cooling air may be transported through the rotor 10, and its induced current member 11, in a greater volume for a given fan size and speed. Thus, heat dissipation is again improved. The increased cooling surface area is most pronounced, as is readily seen from the geometry of both the cooling fins 15 and the radial extent of the magnetic spokes 16. In addition, the air channels 19 are of substantial size to readily conduct air, and they constitute effective air channels rather than mere current conductor slots as in ordinary induction apparatus.

The preferred geometry of the induced current member 11 may be further particularized. The magnetic spokes 16 located within a circumferential length equal to a pole pitch have a cross sectional area, in a circumferential plane, at least substantially the same as the pole surface area of a pole piece finger 28, as illustrated in the fragmentary view of FIG. 3. The cross section area of the inner magnetic rim 14, in a radial plane, has a cross section area at least substantially one-half that of a face of a pole piece finger 28. These dimensions provide conduction of a major portion of the magnetic flux through the inner rim 14 during slow shaft speed operation. The magnetic spokes 16 are also given a substantial length which is at least 15% of the outer radius of the rotor 10, and this radial depth of the spokes may be given in inches as substantially 1.5 inches in a preferred embodiment. The length of each spoke and each air channel 19, including any conductors therein, may also be defined in preferred embodiments as at least three times the width of an air channel. The outer magnetic rim 17 is of lesser cross section area than the inner rim 14, and this cross section area may be one-half or less of that of the inner rim 14. For a preferred embodiment the minimum thickness of the outer rim 17 is about one-eighth inch. In addition, the outer magnetic rim 17 is laced with the current conductor bars 18, which in the embodiment shown create complete gaps in the magnetic circuit afforded by the outer rim 17. Such gaps need not be complete, but are preferably at least substantial, and if desired they may be bridged by magnetic steel placed around the conductor bars 18, so as to achieve a lower reluctance for the rim 17.

Thermal expansion of the rotor 10 is also carefully controlled by the structure of the invention. The slots 20 are provided in the outer rim 17 so that a circumferential expansion may occur which reduces radial expansion to within necessary limits. By slotting the rim 17 the spokes 16 are not restricted to radical expansion by a continuous outer rim, but may have some lateral displacement to accommodate for the circumferential expansion of the rim 17. Dimensional control is also achieved by regulating the temperature of the rim 14 through the number and size of the internal cooling fins 15. The oblique supporting spokes 13 may circumferentially displace themselves upon increased temperatures so as not to unduly increase radial expansion.

Another feature of the invention is the directing of cooling air over heat dissipating surface areas. These heat dissipating surfaces, over which air is passed, comprise the annular field coil 25 as well as portions of the rotor 10, as has hereinabove been described. The fan 6 is of the centrifugal type and may have its fan blades designed within the skill of the fan art to have an effective volume of air flow with quiet operation. In addition, the fan 6 may be driven independently so as to draw large volumes of air at all speeds.

Thus there is provided an induced current torque transmitter that will produce high torque output at low shaft speeds while maintaining high torque values at the higher shaft speeds, and this apparatus may be effectively employed as either a brake or a clutch in heavy duty applications. In addition, the thermal handling capacity of the rotor 10 is very high due to the increased mass of metal represented by the inner rim 14, the spokes 16 and inner cooling fins 15, and as a result for heavy cycling load applications the temperature increase is reduced, thereby achieving the objective of having an induced current torque transmitter capable of handling large cyclic peak loads, as well as large steady state loads. Stresses are decreased and life of the rotor is materially increased.

I claim:
1. In an induced current torque transmitter the combination comprising:
 (a) a field member with a plurality of magnetic poles;
 (b) an induced current member relatively rotatable with respect to said field member having:
  (i) a first magnetic rim spaced from said field member with a gap therebetween to have magnetic flux established therein by said field member,
  (ii) a plurality of magnetic spokes integral with and extending radially from said first magnetic rim in a direction away from said gap,
  (iii) a second magnetic rim integral with said magnetic spokes at their ends away from said first magnetic rim to also have magnetic flux established therein by said field member, which flux passes through said spokes and said first magnetic rim, and
  (iv) a mounting portion spaced radially from said second magnetic rim that includes radially extending supporting spokes attached to such rim for support thereof, and
 (c) said magnetic spokes and magnetic rims defining openings between spokes that form ventilating channels.

2. An induced current torque transmitter in accordance with claim 1 having low resistance conductor bars disposed in and substantially interrupting said first magnetic rim, which bars are circumferentially aligned between said magnetic spokes.

3. An induced current torque transmitter in accordance with claim 1 having a plurality of cooling fins integral with said second rim and extending radially therefrom toward said mounting portion, but terminating short of connection with such portion.

4. In an induced current torque transmitter the combination comprising:
 (a) a field member with a plurality of magnetic poles which has:
  (i) a magnetic frame portion,
  (ii) an annular coil extending concentric with the frame portion and with an outer face thereof spaced from such frame portion to have an air space therebetween,
  (iii) a magnetic pole ring on each axial side of said coil with spaced pole piece fingers extending across the inner face of the coil, said pole rings being spaced from the coil to have air spaces between the sides and inner face of the coil and the pole rings, and
  (iv) circumferentially spaced supports for said coil leaving said air spaces along most all of the surface area of the coil,
 (b) an induced current member relatively rotatable with respect to said field member having:
  (i) a first magnetic rim spaced from said field member with a gap therebetween, (ii) a plurality of magnetic spokes integral with and extending radially from said first magnetic rim in a direction away from said gap, and (iii) a second magnetic rim integral with said magnetic spokes at their ends away from said first magnetic rim; and (c) a fan that moves air through the machine and across the coil surfaces.

5. An induced current torque transmitter as in claim 4 wherein the pole piece fingers of one of said pole rings has air baffles directing air toward the spaces around said coil.

6. In an induced current torque transmitter the combination comprising:

(a) an induced current member of magnetic material having an air gap rim for the conduction of magnetic flux, a thicker second rim concentric with and disposed from the air gap rim also for the conduction of magnetic flux, and a plurality of spokes connecting the rims to one another to form a member having a plurality of circumferentially radially lengthwise spaced openings between the rims and adjacent spokes;

(b) a plurality of low resistance conductor bars in said air gap rim that circumferentially interrupt the rims at positions intermediate said spokes; and (c) a field member closely spaced from said air gap rim presenting a succesion of magnetic poles.

7. An apparatus in accordance with claim 6 in which the spokes across a pole pitch have a total cross section area at least substantially as great as that of a pole face of said field member.

8. An apparatus in accordance with claim 7 in which the second rim has a cross section area at least substantially as great as one-half that of a pole face of said field member.

9. An apparatus in accordance with claim 8 in which the second rim has a cross section area at least twice that of the air gap rim.

10. An apparatus in accordance with claim 6 in which said second rim has an end ring of low resistance material.

11. An apparatus in accordance with claim 10 in which the second rim has a plurality of circumferentially spaced axial extending conductor bars of low resistance material.

12. An apparatus in accordance with claim 6 in which said spokes define air channels between them and the length of the spokes is at least three times the width of an air channel.

13. An apparatus in accordance with claim 12 in which the length of the spokes is at least 15% of the radius of of the induced current member.

References Cited

UNITED STATES PATENTS

| 2,762,940 | 9/1956 | Hansen | 310—105 |
| 2,827,580 | 3/1958 | Jaeschke | 310—105 |
| 3,113,229 | 12/1963 | Jacobs | 310—105 |

ORIS L. RADER, *Primary Examiner.*

G. NUNEZ, *Assistant Examiner.*

U.S. Cl. X.R.

310—166